United States Patent Office 3,519,459
Patented July 7, 1970

3,519,459
PROCESS FOR PRODUCING FINELY
POROUS COATINGS
Peter Hofmann and Christian Guth, Basel, Switzerland,
assignors to Ciba Limited, Basel, Switzerland, a company of Switzerland
No Drawing. Filed Aug. 31, 1965, Ser. No. 484,088
Claims priority, application Switzerland, Sept. 23, 1964,
12,360/64
Int. Cl. B44d 1/32; D06q; D21h 1/10
U.S. Cl. 117—11                                    13 Claims

ABSTRACT OF THE DISCLOSURE

A process is provided for forming finely porous coatings on textiles. In this process the textile to be treated is coated with a mixture containing a (1) polymerizable resin that will cross-link with or without an aminoplast or an epoxide, (2) optionally, an aminoplast or epoxide, (3) a porous granular substance which is insoluble in water, and (4) a substance that prevents the granular substances from being completely enveloped. The coating mixture is then cross-linked. Thereafter, if desired, the granular substance is converted into a water-soluble form and washed out.

It has been found that valuable, finely porous coatings can be produced on textile goods by coating such goods with a mixture containing (a) a polymerization resin that can be cross-linked with itself, with an aminoplast or with an epoxide,
(a') if desired an aminoplast or an epoxide,
(b) a porous, solid, granular substance that is insoluble in cold water, and
(c) a substance that prevents the granular substance (b) from being completely enveloped by the coating (a), the coating mixture is cross-linked and, if desired, the substance (b) is converted into the water-soluble form and then washed out.

The term finely porous coating as used in this context described coatings densely interspersed with very fine pores so that they are permeable to gasses and vapours, especially air saturated with steam, but are substantially impermeable to liquids capable of forming drops, above all water. The coatings can be produced on woven and knitted fabrics of every description, for example made from synthetic fiber such as polyamide fiber, polyester fiber, cellulose acetate fiber, fiber from regenerated cellulose, especially viscose rayon, or from natural cellulose fiber, above all cotton. Likewise suitable are textile goods from mixed spinning products or mixed weaves, for example those from cotton and polyester.

The polymerization resins required for coating must be suitable for cross-linking either with themselves or, if they are not, with epoxides or aminoplasts. As examples of polymers that can be cross-linked with themselves there may be mentioned those which contain carboxylic acid-N-methylolamide groups, for example copolymers from acrylic acid alkyl esters, vinylidenechloride, acrylic acid-N-methylolamide and, if desired, calcium acrylate.

An advantageously used polymerization resin is a polymer that contains free carboxyl groups, that is to say carboxyl groups that have not been functionally modified, and the polymer may be used in the form of the free acid or of a salt, for example an alkali metal salt or ammonium salt, thereof. Preferred copolymers are those which have been manufactured from the free acid, for example acrylic acid, and a preponderant proportion of an alkyl ester such as methyl, ethyl, isopropyl or butyl ester of ethylenically unsaturated acids, for example of chloracrylic, methacrylic or especially of acrylic acid. Thus it is possible to use, inter alia, a polymer from one of the said acrylic acid alkyl esters, from acrylonitrile, advantageously not over 30%, and a small amount, for example 1 to 10%, of acrylic acid.

When an aminoplast is additionally used for cross-linking, it may for example be an unetherified or etherified methylol compound of urea of a urea derivative, such as ethyleneurea, or especially a methylolmelamine; particularly good results are obtained with melamines which are highly etherified with methanol and are highly methylolated, for example on an average on at least 5 or 6 reactive positions of the molecule.

Particularly useful cross-linking epoxides are polyglycidyl compounds containing at least two

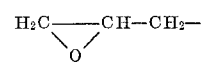

group linked with an oxygen, sulfur or nitrogen atom, such as diglycidyl or polyglycidyl ethers of dihydroxy or polyhydroxy compounds, especially of polyalcohols or polyphenols.

As indicated above, it is necessary to use additionally an aminoplast or epoxide in cases where the polymerization resin used is incapable of cross-linking with itself, although such a further addition may also be made to polymerization resins that can be cross-linked with themselves. The aminoplast or epoxide is used in an amount of 1 to 20%, preferably 8 to 12%, referred to the weight of the completely dry polymerization resin.

The porous substance required in the present process must be granular, having a particle size of, for example, from 10 to 150μ. The individual particles or grains themselves should be porous. The substance must be insoluble at least in cold water. As such porous substances there are suitable those which are substantially insoluble in hot water as well as those which are readily soluble in hot water or can be converted into the water-soluble state by suitable measures. Thus, for example, there may be used porous, finely dispersed water-insoluble mineral substances, especially silicates, for example kaolin or talcum. Particularly good results can be obtained with carbohydrates that are insoluble in cold water, such as starch or dextrin. Referred to the weight of the polymer used (calculated as an anhydrous product) it is advantageous to use 5 to 30% of the porous substance insoluble in cold water.

In addition to the substances described in detail above there is further required in the present process a substance that prevents the granular substance (b) from being completely enveloped by the coating (a). As such separating agents there must be used substances in which the polymerization resin (a) must not be soluble. Particularly useful substances of this type are, for example, silicone oils such as methyl- or phenyl-polysiloxane oil. There may also be used liquid aliphatic hydroxy compounds containing at least 2 hydroxyl groups, such as ethyleneglycol or especially glycerol. The amount of such separating agent ranges advantageously from 2 to 15% referred to the weight of the polymerization resin. Best results are obtained by using about half as much of the separating agent as of the porous, granular substance.

Apart from the substances (a), (b), (c) and in the given case (a') needed for the performance of the present process the coating mixtures may contain further ingredients, for example optical brighteners or pigments. In general, it is particularly advantageous to add a plasticizing agent, for example a mixture of paraffin wax and a condensation product of highly methylated methylolmelamine containing more than 5 methylol groups, and stearic acid, which has been further condensed with triethanolamine. The amount of plasticizer added need not be high and is in general less than 10% of the weight of the polymerization resin.

Unless the mixture is straightaway obtained in a sufficiently viscid form, suitable measures must be taken to ensure that it is made spreadable. It is possible, for example, to add one of the known thickeners. In many cases it is advantageous to prepare water-in-oil or oil-in-water emulsions with the aid of suitable additives. Thus, for example, emulsions of polymers that as such are thinly liquid can be thickened by incorporation of water-insoluble solvents, for example hydrocarbons. Certain emulsions of polymers that contain free carboxyl groups can be thickened also by addition of ammonia.

The mixture is then applied to the textile material in the usual manner, for example with a doctor knife, and dried. It may be applied in one or several layers, but in the latter case intermediate drying is necessary. For cross-linking—especially when the coating contains an aminoplast and a curing catalyst—the coated material is advantageously heated for a short time, for example for several minutes, at a temperature within the range from 140 to 200° C.

The material treated in this manner is porous and impermeable to water. When a porous substance (b) has been used that can be subsequently removed without an appreciable change in the remainder of the coating, and this porous substance is removed, the porosity of the coating is increased. Thus, for example, when starch is used as the porous substance, it can be enzymatically degraded and then washed out of the coating.

In many cases it is advantageous to combine the production of the finely porous coating with a hydrophobizing treatment of the textile material. The latter operation may be performed before or preferably after the coating step in the usual manner, for example with a paraffin wax emulsion, with certain metal compounds (for example of aluminum or zirconium) or with aminoplasts, especially melamine compounds that contain higher alkyl radicals, or with the known methyl hydrogen siloxane emulsions.

The present process is suitable for the production of both unilateral and bilateral coatings as well as for other treatments of textile materials. Thus, for example, foamed products, especially sponge rubber, can be glued on to textile material by means of the coating, without affecting the porosity or impermeability to water.

It is not necessary to mix the requisite ingredients every time textile materials are to be coated; in fact, stable preparations can be manufactured containing:

(a) a polymerization resin that can be cross-linked with itself, with an aminoplast or with an epoxide,
(a') in the given case an aminoplast or an epoxide,
(b) a porous solid, granular substance that is insoluble in cold water, and
(c) a substance that prevents the granular substance (b) from being completely enveloped by the coating (a).

In this connection it should, however, be borne in mind that preparations intended for prolonged storage should not contain any substances that would adversely affect the stability of the preparations. Thus, above all, so-called curing catalysts should be added only immediately before use, or—and this may be more advantageous in many cases—the catalyst is added to the preparation initially and the substance whose reaction is to be catalyzed is added only immediately before using the preparation.

Unless otherwise indicated, parts and percentages in the following examples are by weight.

EXAMPLE 1

100 parts of a 50% aqueous dispersion of a copolymer from 85% of acrylic acid isobutyl ester, 10% of acrylonitrile and 5% of acrylic acid, containing as dispersant 1.4 parts of sodium α-hydroxy-octadecanesulfonate, after vigorous stirring were mixed with 37 parts of heavy gasoline heated to 30° C., in which
3 parts of a mixture of 45% of a product obtained by condensing hexamethylolmelamine hexamethyl ether with stearic acid and then with triethanolamine in the molecular ratio of 2:1:1, 45% of paraffin wax and 10% of tetrachloroethylene have been dissolved. To this mixture there are then added a solution of 0.5 part of ammonium chloride in
1.5 parts of water, and
3 parts by volume of 25% aqueous ammonia.

The coating composition has turned spreadable by then and already contains the catalyst which accelerates the reaction with the melamine resin precondensate (which is yet to be added, namely with advantage immediately before using the spread to ensure its shelf life). There is then added the pore forming mixture of 10 parts of dextrin insoluble in cold water and
5 parts of demethylpolysiloxane oil (for example Silicone Oil DC 200 of Dow Corporation). Before use, there are further added
5 parts of pentamethylolmelamine etherified on about 4 hydroxyl group with methyl groups.

With the aid of a conventional doctor spreading device the coating composition is then applied to a woven polyamide fiber fabric, to a cotton fabric or to a cotton and polyester fabric. After an intermediate drying at 80° C. a second coating is applied on top of the first. After having dried the top coating, likewise at 80° C., cross-linking is carried out by heating for 5 minutes at 150° C. The resulting layers are porous.

If the textile material coated in this manner is padded with an aqueous preparation containing per 1000 parts by volume 60 parts of the above-mentioned mixture of melamine condensation product, paraffin wax and tetrachloroethylene,
15 parts by volume of acetic acid of 40% strength and
3 parts of aluminum sulfate, then dried and hardened for 5 minutes at 150° C., it is still porous that is to say permeable to steam, but has now become water-repellant and waterproof.

EXAMPLE 2

The procedure is the same as in Example 1, except that the coating composition contains 20 instead of 10 parts of dextrin, and 10 parts of glycerol instead of dimethylpolysiloxane oil. In this case the porosity can be substantially improved when the dextrin is subsequently washed out. To make this operation as complete and rapid as possible, the dextrin is first further degraded by means of an enzymatic desizing agent and then removed by a short wash with boiling water. The fabric is then dried again.

EXAMPLE 3

The procedure is the same as in Example 1, but instead of the melamine condensation product only paraffin wax in an identical amount is dissolved in heavy gasoline. Furthermore, instead of polydimethylsiloxane oil a polydiphenylsiloxane oil (for example SISS 555) is used.

EXAMPLE 4

The procedure is the same as in Example 1, except that kaolin is used instead of dextrin. Furthermore, the polydimethylsiloxane oil is replaced by the afore-mentioned polydiphenylsiloxane oil.

EXAMPLE 5

The procedure is as described in Example 1, except that the pentamethylol melamine, which is etherified with methyl groups on 4 hydroxyl groups, is replaced by an equal amount of the water-soluble methyl ether of a urea-formaldehyde reaction product containing per mol of urea about 2 mols of formaldehyde. Furthermore, the polydimethylsiloxane oil is replaced by the afore-mentioned polydiphenylsiloxane oil.

EXAMPLE 6

The procedure is as described in Example 1, except that the 3 parts by volume of 25% ammonia are replaced by 2 parts by volume of 40% aqueous sodium hydroxide solution; for its neutralization and as cross-linking component 2.5 parts of epichlorohydrin are used. Furthermore, 2.5 parts of diglycidyl ether are used as further cross-linking component. On the other hand, the pentamethylol melamine etherified with methyl groups on 4 hydroxyl groups, as well as its catalyst (ammonium chloride), used in Example 1, are dispensed with. Furthermore, the polydimethylsiloxane oil is replaced by the afore-mentioned polydiphenylsiloxane oil.

EXAMPLE 7

The procedure is as described in Example 1, except that the polydimethylsiloxane oil is replaced by polydiphenylsiloxane oil (SISS 555) and, instead of the acrylic resin (which must be rendered spreadable by adding heavy gasoline, condensation products of stearic acid with methylol melamine and ammonia), a dispersion of 30% strength prepared in the following manner:

15 parts of sodium laurylsulfate and 15 parts of sodium α-hydroxyoctadecanesulfonate are dissolved with stirring at about 30 to 35° C. in 900 parts of deionized water in a stirring vessel equipped with reflux condenser and thermometer. The air is then displaced from the apparatus by means of nitrogen and the whole is cooled to 20 to 25° C. The solution is mixed with 11.3 parts of calcium acrylate (1.5%), 50 parts of a 60% aqueous solution of N-methylolacrylamide (4%), 578 parts of n-butylacrylate (80.5%) and 101 parts of vinylidenechloride (14%), and the mixture is heated to an internal temperature of 50° C. while being gently stirred. The mixture prepared in this manner has a pH value of 5 to 6. A solution of 0.35 part of sodium bisulfite in 3.5 parts of deionized water and a solution of 0.7 part of potassium persulfate in 14 parts of deionized water are added at 50° C. Polymerization sets in immediately and is then controlled by intermittent cooling so that the temperature does not rise above 75° C. When the temperature maximum has been reached, the polymerization is finalized by 4 to 5 hours' treatment at about 70 to 75° C.; at approximately the halfway stage of the reaction period another solution of 0.7 part of potassium persulfate in 14 parts of deionized water is added. After cooling, an almost pure emulsion is obtained which has a thickly syrupy consistency and a dry content of 43%. The polymer yield amounts to 94 to 95% of the theoretical.

EXAMPLE 8

The procedure is as described in Example 1, except that the 37 parts of heavy gasoline and the condensation product from stearic acid and methylol melamine dissolved in it are replaced by 50 parts of a 5% aqueous sodium alginate solution.

EXAMPLE 9

The procedure is as described in Example 1, except that starch instead of dextrin is used as the porous substance. To increase the porosity of the final product the starch can subsequently be removed from it by the method described in Example 2.

What is claimed is:
1. A process for producing finely porous coatings on textile products, which comprises coating the said textile products with a mixture containing
 (a) in aqueous dispersion a cross-linkable polymerization resin of the acrylic series containing carboxylic acid N-methylolamide or carboxylic acid groups,
 (b) a porous, solid, granular member insoluble in cold water selected from the group consisting of starch, dextrin and silicates, having a particle size of about 10 to 150 m$\mu$, and
 (c) a substance that prevents the granular substance (b) from being completely enveloped by the cross-linkable polymerization resin (a),
and then cross linking the coating.

2. A process for producing finely porous coatings on textile products, which comprises coating the said textile products with a mixture containing
 (a) in aqueous dispersion a copolymer of the acrylic resin series containing carboxylic acid N-methylolamide groups that can be cross-linked with itself,
 (b) a porous, solid, granular member insoluble in cold water selected from the group consisting of dextrin, starch and silicates, having a particle size of about 10 to 150 m$\mu$, and
 (c) as a substance that prevents the granular substance (b) from being completely enveloped by the cross-linkable polymerization resin (a), a member selected from the group consisting of silicone oil and liquid aliphatic hydroxy compounds containing at least 2 hydroxy groups, and then cross linking the coating.

3. A process for producing finely porous coatings on textile products, which comprises coating the said textile products with a mixture containing
 (a) in aqueous dispersion a copolymer of the acrylic resin series containing carboxylic acid groups that can be cross-linked with an aminoplast,
 (a') an aminoplast,
 (b) a porous, solid, granular member insoluble in cold water selected from the group consisting of starch, dextrin and silicates, having a particle size of about 10 to 150 m$\mu$, and
 (c) as a substance that prevents the granular substance (b) from being completely enveloped by the cross-linkable polymerization resin (a), a member selected from the group consisting of silicone oil and liquid aliphatic hydroxy compounds containing at least 2 hydroxy groups,
and then cross linking the coating.

4. A process for producing finely porous coatings on textile products, which comprises coating the said textile products with a mixture containing
 (a) in aqueous dispersion a copolymer of the acrylic resin series containing carboxylic acid groups that can be cross-linked with an epoxide,
 (a') an epoxide,
 (b) a porous, solid, granular member insoluble in cold water selected from the group consisting of starch, dextrin and silicates, having a particle size of about 10 to 150 m$\mu$, and
 (c) as a substance that prevents the granular substance (b) from being completely enveloped by the cross-linkable polymerization resin (a), a member selected from the group consisting of silicone oil and liquid aliphatic hydroxy compounds containing at least 2 hydroxy groups,
and then cross linking the coating.

5. A process for producing finely porous coatings on textile products, which comprises coating the said textile products, with a mixture containing
 (a) in aqueous dispersion a copolymer of the acrylic resin series containing carboxylic acid groups that can be cross-linked with a methylolmelamine aminoplast,
 (a') a methylolemelamine aminoplast,
 (b) a porous, solid, granular member insoluble in cold water selected from the group consisting of starch, dextrin and silicates, having a particle size of about 10 to 150 m$\mu$, and (c) as a substance that prevents the granular substance (b) from being completely enveloped by the cross-linkable polymerization resin (a), a member selected from the group consisting of silicone oil and liquid aliphatic hydroxy compounds containing at least 2 hydroxy groups, and then cross linking the coating.

6. A process for producing finely porous coatings on textile products, which comprises coating the said textile products with a mixture containing
(a) in aqueous dispersion a copolymer of the acrylic resin series containing carboxylic acid groups that can be cross-linked with a methylol compound of a urea,
(a') a methylol compound of an urea,
(b) a porous, solid, granular member insoluble in cold water selected from the group consisting of starch, dextrin and silicates, having a particle size of about 10 to 150 m$\mu$, and
(c) as a substance that prevents the granular substance (b) from being completely enveloped by the cross-linkable polymerization resin (a), a member selected from the group consisting of silicone oil and liquid aliphatic hydroxy compounds containing at least 2 hydroxy groups, and then cross linking the coating.

7. A process for producing finely porous coatings on textile products, which comprises coating the said textile products with a mixture containing
(a) a copolymer of calcium acrylate, N - methylolacrylamide, n-butylacrylate and vinylidenechloride, which can be cross-linked with itself,
(b) dextrin insoluble in cold water, and
(c) polydiphenylsiloxane oil and then cross-linking the coating.

8. A process for producing finely porous coatings on textile products, which comprises coating the said textile products with a mixture containing
(a) a copolymer of isobutylacrylate, acrylonitrile and acrylic acid that can be cross-linked with a highly etherified pentamethylolmelamine,
(a') a highly etherified pentamethylolmelamine
(b) a silicate
(c) polydiphenylsiloxane oil and then cross-linking the coating.

9. A process for producing finely porous coatings on textile products, which comprises coating the said textile products with a mixture containing
(a) a copolymer of isobutylacrylate, acrylonitrile and acrylic acid that can be cross-linked with a highly etherified pentamethylolmelamine,
(a') a highly etherified pentamethylolmelamine,
(b) a dextrin insoluble in cold water, and
(c) polydimethylsiloxane oil and then cross-linking the coating.

10. A process for producing finely porous coatings on textile products, which comprises coating the said textile products with a mixture containing
(a) a copolymer of isobutylacrylate, acrylonitrile and acrylic acid that can be cross-linked with a highly etherified pentamethylolmelamine,
(a') a highly etherified pentamethylolmelamine,
(b) a dextrin insoluble in cold water, and
(c) glycerol and then cross-linking the coating.

11. A process for producing finely porous coatings on textile products, which comprises coating the said textile products with a mixture containing
(a) a copolymer of isobutylacrylate, acrylonitrile and acrylic acid that can be cross-linked with epichlorhydrin and diglycidyl ether
(a') epichlorhydrin and diglycidyl-ether,
(b) a dextrin insoluble in cold water, and
(c) polydiphenylsiloxane oil and then cross-linking the coating.

12. A textile coating composition containing
(a) in aqueous dispersion a cross-linkable polymerization resin of the acrylic series containing carboxylic acid N-methylolamide or carboxylic acid groups,
(b) a porous, solid, granular member insoluble in cold water selected from the group consisting of starch, dextrin and silicates, having a particle size of about 10 to 150 m$\mu$, and
(c) a substance that prevents the granular substance (b) from being completely enveloped by the cross-linkable polymerization resin (a).

13. A process for producing finely porous coatings on textile products, which comprises coating the said textile products with a mixture containing
(a) in aqueous dispersion a cross-linkable polymerization resin of the acrylic series containing carboxylic acid N-methylolamide or carboxylic acid groups,
(b) a porous, solid, granular starch or dextrin which is insoluble in cold water, having a particle size of about 10 to 150 m$\mu$, and
(c) a substance that prevents the granular substance (b) from being completely enveloped by the cross-linkable polymerization resin (a), and then cross linking the coating, converting the starch or dextrin into the water-soluble form and then washing out said water-soluble form of starch or dextrin.

References Cited

UNITED STATES PATENTS

| | | | |
|---|---|---|---|
| 2,722,869 | 11/1955 | Archer | 117—135.5 X |
| 2,772,322 | 11/1956 | Witt et al. | 264—49 X |
| 3,084,073 | 4/1963 | Kine et al. | 117—135.5 X |
| 3,268,458 | 8/1966 | Strauss et al. | 264—49 X |
| 2,837,440 | 6/1958 | Boivin | 117—11 XR |
| 3,185,582 | 5/1965 | Alegre | 117—11 |
| 3,220,869 | 11/1965 | Ruemens | 117—11 |

FOREIGN PATENTS 159,981  11/1954  Australia.

DAVID KLEIN, Primary Examiner

U.S. Cl. X.R.

117—135.5; 264—49